Patented July 8, 1947

UNITED STATES PATENT OFFICE 2,423,497

PRODUCTION OF PRODUCTS HAVING RECURRING ARYLETHYLENE UNITS WITH TERMINI FROM A SATURATED HALOGENATED ALKANE

Jesse Harmon, Wilmington, Del., assignor to E. I. du Pont de Nemours & Company, Wilmington, Del., a corporation of Delaware No Drawing. Application November 4, 1942, Serial No. 464,519

20 Claims. (Cl. 260—649)

This invention relates to a new type of reaction called "telomerization," and to the products resulting therefrom which are called "telomers."

In copending application Serial No. 438,466, filed April 10, 1942, it has been pointed out that the novelty of this reaction is such that, for adequate description, it has been found necessary to coin new terms to describe the reaction and the participants therein. The reaction has been called "telomerization" (from Greek telos, meaning "end" plus Greek mer meaning "part"). "Telomerization" is defined as the process of reacting, under polymerization conditions, a molecule YZ of a secondary component which is called a "telogen" with more than one unit of a primary component which is a polymerizable compound having ethylenic unsaturation and is called a "taxogen" to form products called "telomers" having the formula $Y(A)_nZ$ wherein $(A)_n$ is a divalent radical formed by chemical union, with the formation of new carbon bonds of $n$ units of the primary component, i. e., the taxogen, the unit A being called a "taxomon," $n$ being any integer greater than one, and Y and Z being fragments of the secondary component, i. e., telogen, attached to the terminal taxomons.

This invention pertains to the application of this novel reaction to polymerizable aromatic mono-olefinic hydrocarbons. "Aromatic mono-olefinic hydrocarbons" means mono-olefinic hydrocarbons having one or more aromatic radicals attached thereto. By the term "polymerizable aromatic mono-olefinic hydrocarbon" is meant any such hydrocarbon which can be polymerized in the presence of benzoyl peroxide.

It is well known that styrene can be converted to a high molecular weight, hard, brittle polymer having essentially the constitution $(C_6H_5C_2H_3)_n$ at elevated temperatures in the presence of catalysts. These polymers generally contain at least 100 styrene units, and often contain 1000 or more units. Similar polymers have also been prepared merely by heating pure monomeric styrene, although considerable periods of time are generally required for the polymerization when carried out in this fashion. The polymers produced by any of these processes are clear, hard, brittle resins with limited or negligible solubility.

It has been observed that the molecular weight of polystyrene is decreased when the polymerization is conducted in the presence of carbon tetrachloride. Breitenbach, Springer, and Abrahamczik (Oesterr. Chem. Ztg. 41, 182 (1938)) studied the thermal polymerization of styrene (i. e., no catalyst employed) in carbon tetrachloride solution and noticed the formation of relatively low molecular weight (average 4–8 styrene units) materials which contained chlorine. These products varied from viscous liquids to greasy solids. Breitenbach and Maschin (Zeit. phys. Chem. 187, 175 (1940)) studied this reaction further and prepared chlorine-containing polystyrenes with a variation in average chain length of from 4.4 to 188 styrene units by varying the ratio of styrene to carbon tetrachloride in the reaction mixture.

This phenomenon was apparently peculiar to the thermal polymerization of styrene in carbon tetrachloride. For example, Williams (J. Chem. Soc. 1940, 775) studied the polymerization of styrene dissolved in carbon tetrachloride and chloroform, using metal halide catalysts such as stannic chloride, boron trichloride, and antimony pentachloride. His products had molecular weights in the range 1300–4000 and contained no chlorine. Furthermore, Staudinger and Steinhofer (Ann. 517, 35 (1935)) investigated the thermal polymerization of styrene dissolved in five times its weight of glacial acetic acid, acetic anhydride, chloroform, pyridine, methanol, and methanol containing 5% HCl. In all these solvents except the first and last, in which no polymerization occurred, there were formed only high molecular weight (about 100,000) polymers which analytical data indicated to be pure hydrocarbons.

This novel reaction is not to be confused with interpolymerization. It is known to the art that, under conditions similar to those employed for the polymerization of styrene, it can be interpolymerized with a wide variety of unsaturated compounds. In the latter reaction, a number of molecules of each reactant enter into the formation of each polymer chain, and the resulting product is a high molecular weight polymeric material. In this novel reaction, however, only one molecule of the secondary component, i. e., telogen, enters into the formation of each molecular species and the average molecular weight of the product is, in general, considerably lower than that of an interpolymer formed under comparable conditions. Just as in the polymerization of styrene, a portion of the styrene can be replaced with another unsaturated compound to form modified polymers or interpolymers, so also in this novel reaction, a portion of the styrene can be replaced by another unsaturated compound to form modified products. These modified products, as in the case of the simple products, will contain but one unit of the secondary component, i. e., telogen, per molecule of the product and will have lower average molecular weights than would have been obtained in the absence of the secondary component, i. e., telogen.

It is an object of this invention to produce new chemical compounds. Another object is to provide a process for reacting a saturated ester or anhydride of an inorganic acid with more than one unit of a polymerizable aromatic mono-olefinic hydrocarbon to produce novel products. A further object is to discover suitable conditions for this reaction. It is a still further object of this invention to provide a process for the preparation of low molecular weight styrene products containing functional end groups. Other objects will appear hereinafter.

It has now been found that the object of the invention can be attained by reacting a saturated ester or anhydride of an inorganic acid as a secondary component, i. e., telogen, with a polymerizable aromatic mono-olefinic hydrocarbon as primary component, i. e., taxogen, under conditions which would normally give rise to polymerization of the latter, in the presence of an agent which is effective as a catalyst for the polymerization of the olefinic hydrocarbon, but ineffective as a catalyst for the Friedel-Crafts reaction; e. g., the reaction of ethyl chloride with benzene. This type of catalyst can be properly called a "telomerization catalyst." The term "saturated," when used to modify "ester or anhydride" in this specification and claims, means that the ester or anhydride is free from aliphatic carbon-to-carbon unsaturation.

The reaction, according to the present invention, of a typical aromatic mono-olefinic hydrocarbon, such as styrene, with a typical secondary component, i. e., telogen, such as ethyl trichloroacetate, is carried out by dissolving pure monomeric styrene in ethyl trichloroacetate, preferably employing a molar excess of the latter, and adding thereto a small amount (generally about 0.1– 0.5% based on the ester) of a catalyst such as benzoyl peroxide. The reaction mixture is then heated, preferably in a closed system, to a temperature of about 150° C. for a period of about eight hours. The necessary reaction time will vary somewhat with the particular secondary component, i. e., telogen, and temperature being employed. However, it is a matter of simple experiment to determine the reaction time necessary to obtain satisfactory conversion of the monomeric styrene.

When the reaction is finished the reactor is cooled and the product is removed therefrom. Since the secondary component, i. e., telogen, is generally employed in excess of the amount of styrene, the unreacted material is removed by suitable means, such as by distillation or steam distillation. If desired, the resulting product may be further purified by dissolving in a suitable solvent, such as acetone, and then carefully fractionally precipitating the product by the slow addition of water to the well stirred solution. In general, of course, the type of purification to which the product is subjected will be dictated by its average chain length, the nature of the functional end groups, and the use for which it is intended.

It must be emphasized that in all cases the product produced by this reaction is not a single molecular species but is a mixture of structurally homologous compounds differing from one another by one or more styrene units. For example, when styrene is telomerized with chloroform, the product obtained is a mixture of compounds of the general formula $H-(C_6H_5C_2H_3)_x-CCl_3$. When ethyl trichloroacetate is employed as the secondary component, i. e., telogen, the product is a mixture of compounds containing a variable number of styrene units with the two fragments of the ethyl trichloroacetate molecule attached to the ends of this chain of styrene units.

It is a very important feature of this novel reaction that it produces a structurally homologous mixture of compounds. That is, the nature of the particular end groups obtained from any given secondary component, i. e., telogen, as well as their mode of attachment in forming the product, are invariably the same, and the constituents of the product mixture differ from one another only in the number of styrene units separating these fragments. This means that a product mixture reacts essentially as a pure compound and can be employed as such for many purposes.

For a given secondary component, i. e., telogen, the average chain length of the product mixture depends primarily on the relative concentrations of styrene and secondary component, i. e., telogen. Accordingly, when products of relatively long chain are desired, the concentration of the styrene relative to that of the secondary component, i. e., telogen, should be increased and vice versa. A variation in chain length can also be achieved for any given relative concentration of styrene to secondary component, i. e., telogen, by varying the reaction temperature. Thus, for a given concentration of styrene and secondary component, i. e., telogen, high reaction temperatures tend to produce mixtures of shorter chain products and vice versa.

The average chain length of the product mixture is also a function of the particular secondary component, i. e., telogen, employed. For example, under comparable conditions, the average chain length of the products formed from ethyl chloroacetate as the secondary component, i. e., telogen, is considerably longer than that of those formed from ethyl trichloroacetate.

In order that the process may be more fully understood, the following specific examples are given by way of illustration, but the invention is not limited thereto as will become more apparent hereinafter. Whereever the term "parts" is used, it is intended to mean "parts by weight."

Example I

A mixture of 21 parts of styrene, 126 parts of bromoform, and 0.42 part of benzoyl peroxide is heated for 24 hours during which time the temperature is gradually raised from 90 to 120° C. It is then distilled under reduced pressure to remove the excess bromoform and any unreacted styrene. A few parts of bromine-containing products boiling higher than bromoform are also removed by distillation up to a temperature of 112° C. at a pressure of 0.4 mm. The remainder of the product is a liquid (18 parts) which becomes highly viscous on cooling to room temperature. It contains 22.05% bromine, from which the molecular weight, 1090, is calculated on the basis that each product molecule contains the elements of one molecule of bromoform. This corresponds to an average composition of $(C_6H_5C_2H_3)_8 \cdot CHBr_3$.

Example II

A mixture of 96 parts of ethyl trichloroacetate, 26 parts of styrene, and 0.52 part of benzoyl peroxide is heated to boiling in a vessel equipped with a reflux condenser. As the reaction proceeds the temperature of the boiling liquid rises gradually from 161° C. to 171° C. over a period of about eight hours. Heating for an additional 16 hours causes a further rise in temperature of only about 1° C., showing that the reaction is essentially complete. The excess ethyl trichloroacetate is then removed by distillation under reduced pressure, and the residue, a clear brown liquid (40 parts), is freed of remaining traces of the ester by prolonged heating under reduced pressure at 100° C. Upon cooling to room temperature it becomes highly viscous. The average molecular weight of the product, 654, is calculated from the chlorine content of 16.28% on the basis of 3 chlorines (1 ethyl trichloroacetate molecule) per product molecule. This corresponds to an average composition of 4.45 styrene units and one ethyl trichloroacetate unit.

By prolonged treatment with dilute aqueous sodium hydroxide at 100° C. this product can be largely converted to an alkali-soluble derivative which is essentially chlorine-free and which shows surface activity.

*Example III*

A mixture of 37 parts of iodoacetic acid, 10 parts of styrene and 0.1 part of benzoyl peroxide is heated in a closed vessel for 6 hours at 160° C. The liquid product solidifies to a rubbery mass upon cooling to room temperature. It is separated from the excess iodoacetic acid by dissolving it in a solvent such as acetone, in which it is readily soluble, and slowly introducing the solution, with stirring, into a large volume of water. The precipitated product is then filtered from the water solution which contains the unreacted idoacetic acid.

The telomer species in the mixture cover a wide range of molecular weights. The entire product is soluble in acetone, but only the lower molecular weight constituents are soluble in methanol. By virtue of this fact, it is possible to separate the product into fractions of higher and lower molecular weight by dissolving it in acetone and adding sufficient methanol to precipitate about a quarter of the product. This portion, comprising the species of higher molecular weight, is found to contain 1.18% of iodine, corresponding to an average molecular weight of 10,750 or an average composition of 100 styrene units and one iodoacetic acid unit. Lower molecular weight products are obtained by evaporation of the solvent from the methanol-soluble fraction.

*Example IV*

A mixture of 26 parts of styrene, 60 parts of chloroform, and 0.5 part of benzoyl peroxide is heated in a closed vessel at 100° C. for 16 hours. The unreacted starting materials are removed from the product by exhaustive steam distillation. The residue is a brittle white solid (20 parts) which can be easily reduced to a powder by grinding. It is soluble in acetone and can be precipitated from that solution by the addition of methanol. The chlorine content of 0.20% corresponds to an average molecular weight of 53,200.

That a catalyst for this novel reaction is essential can be illustrated by duplicating the above process in every detail except in the omission of benzoyl peroxide. The only product is polystyrene (4 parts) which differs from the product of this novel reaction in being of higher molecular weight and insoluble in acetone and in containing no chlorine.

*Example V*

The enhanced activity of a secondary component, i. e., telogen, containing iodine is shown by the following example.

A mixture of 51 parts of chloroiodomethane, 17.3 parts of styrene, and 0.17 part of benzoyl peroxide is heated in a closed vessel for 5.5 hours at 150° C. The product is washed with a 5% aqueous solution of sodium hydroxide followed by water, and is then dried and distilled under reduced pressure. After recovery of most of the unreacted chloroiodomethane and styrene, the residue is heated at 100° C. for several hours under a pressure of 2 mm. to remove the last traces of these. The resulting product is a highly viscous sticky liquid. Its chlorine content of 1.52% corresponds to an average molecular weight of 2,340, or to an approximate average composition of 21 styrene units plus the elements of one unit of chloroiodomethane.

*Example VI*

The first process of Example IV is repeated with the modification that the mixture is heated for 20 hours at 160° C. The product is a brittle white solid (25.6 parts) which contains 1.86% chlorine. This is equivalent to an average molecular weight of 5730, calculated on the basis of 3 chlorine atoms (1 chloroform molecule) per product molecule. The approximate average constitution is thus $(C_6H_5C_2H_3)_{53}.CHCl_3$.

*Example VII*

The process of Example VI is repeated with the modification that 0.25 part of diethyl peroxide is substituted for the 0.5 part of benzoyl peroxide. A brittle white product containing 1.22% chlorine is obtained in quantitative yield. The average molecular weight calculated from the chlorine content is 8760, corresponding to an average composition of $(C_6H_5C_2H_3)_{83}.CHCl_3$.

*Example VIII*

A Monel metal bomb is filled to 0.6 of its capacity with a mixture of 52 parts styrene, 100 parts carbon tetrachloride, and 1.5 parts benzoyl peroxide. The bomb is closed and heated at 120° C. for 8 hours while rotating to provide agitation. It is then cooled, opened, and the liquid product subjected to exhaustive steam distillation to remove volatile constituents. The residue consists of 46 parts of styrene-carbon tetrachloride product in the form of a white brittle solid. This solid product contains 14.5% chlorine which corresponds to an average composition of $$Cl(C_6H_5C_2H_3)_8CCl_3$$

This novel reaction can be carried out using as a primary component, i. e., taxogen, any polymerizable aromatic mono-olefinic hydrocarbon such as, for example, styrene, 1-vinyl-4-methyl-benzene, indene, alpha and beta substituted styrenes (alpha-methyl styrene, beta-ethyl styrene, etc.). The preferred members of this class are aromatic vinyl compounds, particularly styrene, nuclear substituted styrenes (1-vinyl-4-ethyl-benzene, for example), vinyl naphthalene, etc. Especially preferred are aromatic vinyl compounds containing not more than 12 carbon atoms.

The secondary components, i. e., telogens, with which this invention is concerned are saturated esters and anhydrides of inorganic acids. As examples of general classes of compounds which fall within this group, there may be mentioned halogenated derivatives of aliphatic hydrocarbons, e. g., $CCl_4$, $CCl_3F$, $CHCl_3$, $CH_2Cl_2$, $CH_2ClI$, $CH_3I$, $CH_3Br$, $CH_3Cl$, $CH_3CCl_3$, $CH_3CH_2Br$, and $CH_3CCl_2CH_3$; acids such as $Cl_3CCO_2H$, $$Cl_2CHCO_2H$$

$ClCH_2CO_2H$, $CH_3CHBrCO_2H$, and $$CH_2Br-CH_2CO_2H$$

esters such as $Cl_3C-COO-C_3H_7$, $Cl_2CH-COO-C_2H_5$, $ClCH_2-COO-CH_3$ $CH_3-CHBr-COO-C_2H_5$, and $CH_2Br-CH_2-COO-CH_3$; anhydrides such as $(Cl_3C-CO)_2O$, $(Cl_2CH-CO)_2O$, $(ClCH_2-CO)_2O$, and $(CH_3-CHBr-CO)_2O$; aldehydes such as $Cl_3CCH=O$ and $ClCH_2-CH_2-CH=O$; alcohols such as $Cl_3CCH_2OH$, $BrCH_2CH_2OH$, $$ClCH_2CHOH-CH_2OH$$

and $CH_2OH-CHCl-CH_2OH$; ethers such as $$ClCH_2-O-CH_3, ClCH_2-O-CH_2Cl$$

$ClCH_2-CH_2-O-CH_2-CH_2-Cl$, and

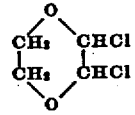

acyl halides such as $CH_3COCl$, $CH_3COBr$, $ClCH_2COCl$, $CH_3CH_2CH_2COCl$, $ClCO-COCl$, and $COCl_2$; sulfonyl halides such as $C_6H_5-SO_2Cl$, $ClSO_3H$, $Cl_3C-SO_2Cl$, $CH_3SO_2Cl$, and $SO_2Cl_2$; sulfur halides such as $SCl_2$ and $S_2Cl_2$; alkyl esters of inorganic acids such as $(C_2H_5O)_3B$, $(C_2H_5O)_4Si$, $(C_4H_9O)_3PO$, $CH_3OSO_3H$, $$(CH_3O)_2SO_2$$

and $(CH_3O)_2SO$; halogens such as $Cl_2$, $Br_2$, and $I_2$; and cyanogen and its halogen derivatives such as $(CN)_2$, $BrCN$, and $ClCN$. The preferred members of this class are halogenated organic compounds, more particularly halogenated aliphatic hydrocarbons which may be straight or branch chained or may be saturated cyclic compounds. Especially preferred in this class are halogenated derivatives of methane such as carbon tetrachloride, chloroform, trichlorofluoromethane, methylene chloroiodide, etc. Another preferred class of halogenated organic compounds are the saturated, halogenated carboxylic esters. A third preferred group is the saturated aliphatic esters of inorganic oxyacids of non-metallic elements selected from groups III—A, IV—A, V—A, and VI—A of the periodic table, especially those lying above the heavy line in the periodic table as shown by Deming (General Chemistry, second edition, published 1925 by John Wiley & Sons, Inc., New York). Of these, the preferred group is the alkyl esters of inorganic acids of sulfur, phosphorus, and silicon; more especially alkyl sulfates, phosphates, and silicates.

In order to have an ester or anhydride within the scope of this invention, it is not necessary that the parent compound, i. e., the acid, be an actual one; it may, in fact, be hypothetical. The following table illustrates typical esters and anhydrides which can be used in the preparation of telomers:

Table

| Secondary Component, i. e., Telogen | Hypothetical Parent Compounds |
|---|---|
| $CCl_4$ | $C(OH)_4+HCl$ |
| $HCCl_3$ | $HC(OH)_3+HCl$ |
| $H_2CCl_2$ | $H_2C(OH)_2+HCl$ |
| $H_3CCl$ | $H_3COH+HCl$ |
| $CH_2ClI$ | $H_2C(OH)_2+HCl+HI$ |
| $Cl_3CCHO$ | $(HO)_3CCHO+HCl$ |
| $Cl_3CCCl_3$ | $(HO)_3CC(OH)_3+HCl$ |
| $(CH_3)_2SO_4$ | $CH_3OH+H_2SO_4$ |
| $SO_2Cl_2$ | $H_2SO_4+HCl$ |
| $Cl_2$ | $HOCl+HCl$ |
| $(CN)_2$ | $HOCN+HCN$ |
| $BrCN$ | $HOCN+HBr$ |
| $(COCl)_2$ | $(COOH)_2+HCl$ |
| $(C_2H_5O)_4Si$ | $C_2H_5OH+H_4SiO_4$ |
| Hexachlorobenzene | Hexahydroxybenzene+HCl |

It is not intended that the invention be limited in scope to reaction, according to the present invention, involving only polymerizable aromatic mono-olefinic hydrocarbons as primary components, i. e., taxogens. For example, it is known that styrene can be interpolymerized with a wide variety of unsaturated compounds. Among such, there may be mentioned propylene, isobutylene, and similar mono-olefinic hydrocarbons; vinyl esters, such as vinyl acetate, vinyl formate, and vinyl isobutyrate; and such acids as acrylic, methacrylic, itaconic, citraconic, crotonic, maleic, and fumaric, as well as their derivatives, such as esters, acid halides, and anhydrides. Other compounds which can be interpolymerized with styrene include vinyl chloride, tetrafluoroethylene, vinylidene chloride, vinyl cyanide, N-vinyl imides, vinyl ethers, divinyl formal, divinyl butyral, methyl vinyl ketone, and butadiene. Just as the polymerization reaction is applicable to the interpolymerization of polymerizable aromatic mono-olefinic hydrocarbons such as styrene with other unsaturated compounds, so also is this novel reaction applicable to mixtures of polymerizable aromatic mono-olefinic hydrocarbons with other unsaturated compounds, such as those mentioned above, as primary components, i. e., taxogens. When more than one primary component, i. e., taxogen, is used in this novel reaction it can be referred to as "intertelomerization."

While a mixture of secondary components, i. e., telogens, can be used in this novel reaction, this is generally undesirable because it gives a mixture of products which do not all belong to the same homologous series.

While the reaction of the present invention generally occurs in the presence of a peroxygen catalyst, some agents, e. g., hexachloroethane, can function as both the secondary component, i. e., telogen, and the catalyst. The catalysts used in the process of this invention are agents which are effective as catalysts for the polymerization of styrene or its homologues and which agents are, at the same time, ineffective as catalysts for the Friedel-Crafts reaction. It must be specifically understood that the process of the present invention is not related to the Friedel-Crafts type reactions and that the Friedel-Crafts type catalysts, such as aluminum chloride, boron trifluoride, sulfuric acid, and hydrofluoric acid, are inoperative for the present process. While the agents used in the present reaction are commonly spoken of as catalysts, it is thought that they do not act as inert catalyzing agents such, for example, as carbon black, but that they take part in the reaction in some way. In fact, it may be that a better term for these agents would be reaction promoters. However, since reaction promoters have been called catalysts so generally in the art, and since the mechanics of the present process are not clearly established, the term "catalyst" has been employed herein.

Both polymerization of styrene type compounds and Friedel-Crafts reactions with these same type compounds are so well known that any one skilled in the art will be able, without difficulty, to select a catalyst which would be effective to promote polymerization and ineffective to promote Friedel-Crafts reaction. By way of example, however, the following suitable catalysts are mentioned: peroxygen compounds, e. g., diacyl peroxides such as diacetyl peroxide, dipropionyl peroxide, dibenzoyl peroxide, dilauroyl peroxide, and benzoyl acetyl peroxide; alkali and ammonium persulfates, perborates, and percarbonates; other peroxides such as hydrogen peroxide, ascaridole, tetrahydronaphthalene peroxide, diethyl peroxide, and cyclohexanone peroxide; molecular oxygen;

such metal alkyls as tetraethyl lead and tetraphenyl lead; ultraviolet light, especially in the presence of such photosensitizers as mercury, alkyl iodides, benzoin, and acetone; amine oxides, e. g., trimethylamine oxide, triethylamine oxide, and dimethyl aniline oxide; dibenzoyl hydrazine; hydrazine salts such as hydrazine dihydrochloride and hydrazine sebacate; and hexachloroethane. The catalyst is used in amounts varying from about 0.001 to 1.0 per cent by weight of the secondary component, i. e., telogen, the preferred range in the case of the peroxygen catalysts being 0.05 to 0.5 per cent.

Of this group of catalysts, it is preferred to use peroxygen compounds, especially the diacyl peroxides and the alkali and ammonium persulfates. The other member of the preferred group of catalysts is molecular oxygen, which may be considered a special case of this group. It should be emphasized, however, that, to be effective as a catalyst, molecular oxygen should be present in small quantity, such as, for example, less than 1000 parts per million. As is generally the case in peroxygen catalyzed vinyl polymerizations, oxygen in larger quantities than this has a deleterious effect upon the reaction.

This novel reaction can be carried out over a wide range of temperatures from room temperature to over 250° C. In fact, the upper temperature limit for this novel reaction is determined by the thermal stability of the various reactants and products. The preferred temperature for any given reaction, according to the present invention, depends primarily on the catalyst and the secondary component, i. e., telogen, being employed, and on the chain length desired in the resulting product. For the majority of common cases, the preferred reaction temperature lies within the range 50 to 200° C. The preferred catalysts, such as the diacyl peroxides, the persulfates, and oxygen, are generally employed in this temperature range, and the preferred classes of secondary components, i. e., telogens, react satisfactorily under such conditions. Superatmospheric pressure can be employed in the reaction, according to the present invention, of styrene, but it is generally advantageous only when the secondary component, i. e., telogen, is so low boiling that a satisfactory reaction temperature cannot be achieved at atmospheric pressure.

The ratio of secondary component, i. e., telogen, to primary component, i. e., taxogen, used in this novel reaction can be varied widely. In general, increasing the ratio of secondary component, i. e., telogen, to primary component, i. e., taxogen, decreases the average molecular weight of the product. The preferred molecular ratio of secondary component, i. e., telogen, to primary component, i. e., taxogen, will depend upon the nature of the reactants and the chain length of the product desired, but will generally be in the range of 10:1 to 1:10.

Inert organic diluents, particularly hydrocarbons, such as aliphatic and cycloaliphatic hydrocarbons, can be employed in the practice of this invention, but generally speaking their use entails no particular advantage. It is also feasible, and sometimes preferable, however, to employ water as a diluent in the reaction. When water is to be employed, it is generally preferable to carry out this novel reaction after the manner commonly employed in the so-called emulsion polymerizations of unsaturated compounds. That is, it is advisable to use a surface-active agent and to provide vigorous agitation for the reacting system in order that intimate contact of all reactants may be assured throughout the course of the reaction. When water is employed, the optimum pH of the reaction mixture is generally determined by the surface-active agent and catalyst employed, rather than by any intrinsic properties of the reaction system of this novel reaction.

While the invention is not limited to any particular emulsifying agent, such compounds as soluble salts of quaternary ammonium bases which contain at least one long-chain aliphatic group such, for example, as cetyl and octadecyl trimethyl ammonium bromides, diethylamino ethyl oleyl amide hydrochloride, and octadecyl betaine; the soluble salts of sulfate esters of long-chain aliphatic alcohols, such as the sodium salt of cetyl, octadecyl, or acetoxyoctadecyl sulfates; the alkali metal salts of sulfonated unsaturated hydrocarbons, such as sodium salt of abietene sulfonic acid; the alkali metal salts of alkyl naphthalene sulfonic acids; etc., are operative. However, the use of surface-active agents is entirely optional.

Although, as has been mentioned above, oxygen in small concentrations can, in the absence of other catalytic agents, act as a catalyst for this novel reaction, its presence in larger quantities is to be scrupulously avoided. This is in agreement with the now generally accepted fact that, in any peroxygen catalyzed vinyl polymerization, oxygen in appreciable quantities has a deleterious effect, not only upon yield, but, in many cases, upon the quality of the product produced. Likewise, in reaction, according to the present invention, it is preferred to reduce the oxygen content of the reaction system to a practical minimum.

It is sometimes desirable to add one or both of the reactants to the system as the reaction progresses. This can be done by injection of the vapor or liquid into the reaction system by well known means. It is also feasible to add a catalyst to the system as the reaction progresses. This can be accomplished, for example, by injecting a solution of the catalyst in one of the reactants or in an inert solvent. This procedure is especially advantageous in those cases where the reaction takes place very rapidly.

If one of the reactants is a solid, such as the catalyst or the secondary component, i. e., telogen, it is also feasible to add this reactant to the system either as a solid, generally finely divided, or in solution in one of the reactants or an inert diluent. Portionwise or slow continuous addition of the catalyst to the reacting system facilitates the control of the reaction, especially in those cases in which condensation through this novel reaction takes place rapidly, and generally leads to higher yields in shorter periods of time.

It is within the scope of this invention to carry out reactions in a continuous flow system. For example, a mixture of reactants and catalyst can be passed continuously through a zone which is under conditions adapted to this novel reaction. Alternatively, the catalyst can be injected into the system which is passing through the reaction zone. In some cases, advantages may be derived by adding one of the reactants to the mixture in the reaction zone. This is especially true when the reaction is so rapid as to cause a marked change in concentration of one of the reactants. Continuous operation possesses many technical advantages such as economy of operation, accurate control of the reaction, and flexibility of operation. By continuous operation, a constant ratio of reactants can be maintained during the reaction if so desired.

The invention provides new and useful compounds. The products are usually mixtures of compounds differing from each other in the number of taxomon units. Thus, the invention provides, as new products, mixtures of compounds having the general formula $$Y—(A)_n—Z$$

wherein $n$ is an integer greater than unity, $(A)_n$ is a divalent radical formed by condensation of a polymerizable aromatic mono-olefinic hydrocarbon and Y and Z are fragments of a saturated ester or anhydride containing from one to three inorganic acid residues attached to one carbon atom. For some purposes products are preferred wherein $n$ has an average value of from 2 to 30. Preferably $(A)_n$ is a divalent radical formed by condensation of a polymerizable aromatic vinyl compound of from 8 to 12 carbon atoms, especially styrene. Also preferably Y and Z are fragments of halogen substituted methanes of from one to three halogen atoms, especially chlorine substituted methanes.

The uses to which styrene telomers can be put depend upon the nature of the functional groups introduced by virtue of the secondary component, i. e., telogen, or upon the low molecular weight imparted to the styrene telomer by virtue of this novel reaction, or upon a combination of these properties. For example, low molecular weight styrene telomers which possess carboxylic acid end groups, or other functional groups which can be converted to carboxylic acids, can, by virtue of their alkali solubility, find use as surface-active agents, detergent ingredients, ingredients for water repellents, etc. Furthermore, styrene telomers possessing oxygenated functional end groups may be advantageously employed as wax ingredients, especially for the preparation of waxes in uses as polishes, carbon paper preparations, coating compositions, etc. Since it is apparent that the nature of the end groups imparted to the molecule by this novel reaction will have an important bearing on the applications of these products in such fields, it is apparent that a wide variety of different and useful compounds is available by the process of this invention.

It is apparent that many widely different embodiments of this invention may be made without departing from the spirit and scope thereof, and, therefore, it is not intended to be limited except as indicated in the appended claims.

I claim:

1. Process for the manufacture of products having a chain comprising a plurality of recurring styrene units and, attached to the terminal units of the chain, one H— radical and one —CCl₃ radical, respectively, which comprises maintaining styrene and chloroform in contact with benzoyl peroxide until said products are formed and isolating said products.

2. Process for the manufacture of products having a chain comprising a plurality of recurring styrene units, one of the terminal valences of the chain being satisfied by a monovalent atom, the other terminal valence of the chain being satisfied by a monovalent radical which together with said monovalent atom forms a chlorinated methane of one to three chlorine atoms, which comprises maintaining styrene and the chlorinated methane in contact with benzoyl peroxide until said products are formed and isolating said products.

3. Process for the manufacture of products having a chain comprising a plurality of recurring styrene units, one of the terminal valences of the chain being satisfied by a monovalent atom, the other terminal valence of the chain being satisfied by a monovalent radical which together with said monovalent atom forms a chlorinated methane, which comprises maintaining styrene and the chlorinated methane in contact with benzoyl peroxide until said products are formed and isolating said products.

4. Process for the manufacture of products having a chain comprising a plurality of recurring styrene units, one of the terminal valences of the chain being satisfied by a monovalent atom, the other terminal valence of the chain being satisfied by a monovalent radical which together with said monovalent atom forms a halogenated methane, which comprises maintaining styrene and the halogenated methane in contact with benzoyl peroxide until said products are formed and isolating said products.

5. Process for the manufacture of products having a chain comprising a plurality of recurring styrene units, one of the terminal valences of the chain being satisfied by a monovalent atom, the other terminal valence of the chain being satisfied by a monovalent radical which together with said monovalent atom forms a chlorinated methane, which comprises maintaining styrene and the chlorinated methane in contact with a peroxygen compound as a catalyst until said products are formed and isolating said products.

6. Process for the manufacture of products having a chain comprising a plurality of recurring styrene units, one of the terminal valences of the chain being satisfied by a monovalent atom, the other terminal valence of the chain being satisfied by a monovalent radical which together with said monovalent atom forms a halogenated methane, which comprises maintaining styrene and the halogenated methane in contact with a peroxygen compound as a catalyst until said products are formed and isolating said products.

7. Process for the manufacture of products having a chain comprising a plurality of recurring units $$-\underset{\underset{Ar}{|}}{CH}-CH_2-$$

wherein Ar is a monovalent aromatic hydrocarbon radical of 6 to 10 carbon atoms, one of the terminal valences of the chain being satisfied by a monovalent atom and the other terminal valence of the chain being satisfied by a monovalent radical which together with said monovalent atom forms a chlorinated methane of one to three chlorine atoms which comprises maintaining the chlorinated methane and a polymerizable aromatic vinyl hydrocarbon of 8 to 12 carbon atoms and of the formula $ArCH=CH_2$, wherein Ar is as above, in contact with a peroxygen compound as a catalyst until said products are formed and isolating said products.

8. Process for the manufacture of products having a chain comprising a plurality of recurring units $$-\underset{\underset{Ar}{|}}{CH}-CH_2-$$

wherein Ar is a monovalent aromatic hydrocarbon radical of 6 to 10 carbon atoms, one of the terminal valences of the chain being satisfied by a monovalent atom and the other terminal valence of the chain being satisfied by a monovalent radical which together with said monovalent atom forms a halogenated methane of one to three halogen atoms, which comprises maintaining the halogenated methane and a polymerizable aromatic vinyl hydrocarbon of 8 to 12 carbon atoms and of the formula $ArCH=CH_2$, wherein Ar is as above, in contact with a peroxygen compound as a catalyst until said products are formed and isolating said products.

9. Process for the manufacture of products having a chain comprising a plurality of recurring units

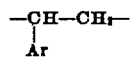

wherein Ar is a monovalent aromatic hydrocarbon radical and, attached to the terminal units of the chain, a H— radical and a —CCl₃ radical, respectively, which comprises maintaining a polymerizable aromatic vinyl hydrocarbon of 8–12 carbon atoms and of the formula $ArCH=CH_2$, wherein Ar is as above, and chloroform in contact with a peroxygen compound as a catalyst until said products are formed and isolating said products.

10. A mixture of compounds having a chain comprising a plurality of recurring styrene units, the terminal valences of the chain being satisfied by one H— radical and one —CCl₃ radical, respectively.

11. A mixture of compounds having a chain comprising a plurality of recurring

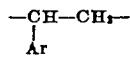

units, the terminal valences of the chain being satisfied by one H— radical and one —CCl₃ radical, respectively, and Ar being a monovalent aromatic hydrocarbon radical of 6–10 carbon atoms.

12. A mixture of compounds having a chain comprising a plurality of recurring styrene units, one of the terminal valences of the chain being satisfied by a monovalent atom and the other terminal valence of the chain being satisfied by a monovalent radical which together with said monovalent atom forms a chlorinated methane of one to three chlorine atoms.

13. A mixture of compounds having a chain comprising a plurality of recurring

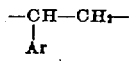

units, wherein Ar is a monovalent aromatic hydrocarbon radical of 6 to 10 carbon atoms, one of the terminal valences of the chain being satisfied by a monovalent atom and the other terminal valence of the chain being satisfied by a monovalent radical which together with said monovalent atom forms a chlorinated methane of one to three chlorine atoms.

14. A mixture of compounds having a chain comprising a plurality of recurring

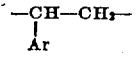

units, wherein Ar is a monovalent aromatic hydrocarbon radical of 6 to 10 carbon atoms, one of the terminal valences of the chain being satisfied by a monovalent atom and the other terminal valence of the chain being satisfied by a monovalent radical which together with said monovalent atom forms a halogenated methane of one to three halogen atoms.

15. Process for the production of products $$H(C_6H_5 \cdot C_2H_3)_n CCl_3$$

having average molecular weights ranging from about 5,730 to about 53,200 and the corresponding values for $n$ which comprises heating styrene with chloroform at 100–160° C. for 16–20 hours in the presence of an organic peroxide.

16. A mixture of products of the formula $$H(C_6H_5 \cdot CHCH_2)_n CCl_3$$

of average molecular weight of about 5,730 to about 53,200 with the corresponding values for $n$, said mixture being white, brittle, and solid.

17. Process for the manufacture of products having a chain comprising a plurality of recurring styrene

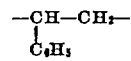

units, one terminal valence of the chain being satisfied by a monovalent atom, the other terminal valence of the chain being satisfied by a monovalent radical which together with said monovalent atom forms a saturated halogenated alkane having from one to three halogens and those on one carbon and having from one to three carbons, which comprises maintaining styrene and the saturated halogenated alkane in contact with a peroxygen compound as a catalyst until said products are formed and isolating said products.

18. A mixture of products having a chain comprising a plurality of recurring styrene

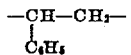

units, one terminal valence of the chain being satisfied by a monovalent atom, the other terminal valence of the chain being satisfied by a monovalent radical which together with said monovalent atom forms a saturated halogenated alkane having from one to three halogens and those on one carbon and having from one to three carbons.

19. Process for the manufacture of products having a chain comprising a plurality of recurring

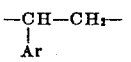

units, Ar being an aryl radical of 6 to 10 carbon atoms, one terminal valence of the chain being satisfied by a monovalent atom and the other terminal valence being satisfied by a monovalent radical which together with said monovalent atom forms a saturated halogenated alkane of one to three carbons, which comprises maintaining an aryl ethylene $ArCH=CH_2$, wherein Ar is as above, and the saturated halogenated alkane in contact with a peroxygen compound as a catalyst until said products are formed and isolating said products.

20. Process for the manufacture of products having a chain comprising a plurality of recurring

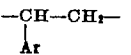

units, Ar being a monovalent aromatic hydrocarbon radical of 6 to 10 carbon atoms, one terminal valence of the chain being satisfied by a monovalent atom and the other terminal valence being satisfied by a monovalent radical which together with said monovalent atom forms a saturated halogenated alkane of one to three carbons, which comprises maintaining an aryl ethylene ArCH=CH₂ wherein Ar is as above, and the saturated halogenated alkane in contact with, as a catalyst, a member of the class consisting of peroxygen compounds and molecular oxygen, until said products are formed and isolating said products.

JESSE HARMON.

REFERENCES CITED

The following references are of record in the file of this patent:

UNITED STATES PATENTS

| Number | Name | Date |
|---|---|---|
| 1,890,772 | Dykstra | Dec. 13, 1932 |
| 2,097,155 | Groll | Oct. 26, 1937 |
| 2,139,394 | Van Peski | Dec. 6, 1938 |
| 2,283,236 | Soday | May 19, 1942 |
| 2,012,177 | Voss | Aug. 20, 1935 |
| 2,186,360 | Britton | Jan. 9, 1940 |

FOREIGN PATENTS

| Number | Country | Date |
|---|---|---|
| 580,366 | Germany | July 13, 1933 |
| 438,820 | Great Britain | Nov. 25, 1935 |

OTHER REFERENCES

Holmberg Chem. Absts., vol. 34, pp. 2341–2342.
Kharasch, "Chemistry & Industry," 1938, pp. 752, 774 and 775.